(12) United States Patent
Nichols-Roy (10) Patent No.: US 6,260,574 B1
(45) Date of Patent: Jul. 17, 2001

(54) TOILET TANK FILL VALVE CONNECTABLE TO RISER WITH PRE-SELECTED HEIGHT

(75) Inventor: David Nichols-Roy, Escondido, CA (US)

(73) Assignee: Lavelle Industries, Inc., Burlington, WI (US)

( * ) Notice: Subject to any disclaimer, the term of this patent is extended or adjusted under 35 U.S.C. 154(b) by 0 days.

(21) Appl. No.: 09/580,461

(22) Filed: May 26, 2000

(51) Int. Cl.[7] ............................ F16K 31/34; F16K 47/02; E03B 7/07

(52) U.S. Cl. .................... 137/414; 137/428; 137/436; 137/550; 138/42; 251/127

(58) Field of Search ........................................ 137/414, 426, 137/434, 436, 437, 443, 444, 550, 428; 138/42; 251/127

(56) References Cited

U.S. PATENT DOCUMENTS

| | | | | |
|---|---|---|---|---|
| 3,853,141 | * | 12/1974 | Fischer | 137/436 |
| 5,255,703 | * | 10/1993 | Johnson | 137/428 |
| 5,623,961 | | 4/1997 | Nichols-Roy | 137/377 |
| 5,715,859 | | 2/1998 | Nichols-Roy | 137/426 |
| 5,964,247 | * | 10/1999 | Johnson | 137/414 |

* cited by examiner

*Primary Examiner*—George L. Walton
(74) *Attorney, Agent, or Firm*—Michael H. Jester (57) ABSTRACT

A fill valve particularly suited for OEM assembly in gravity operated flush toilets has a modular construction including a main valve body that encloses a pilot operated diaphragm valve operated by a float arm. A hollow riser has a lower end configured for connection to a water supply line. Mating couplers are provided on the bottom of the main valve body and on the upper end of the riser for rigidly securing the riser to the main valve body. The riser has a length that is pre-selected to place the diaphragm valve and float arm a predetermined height within the tank to ensure that the tank is re-filled to a predetermined optimum level.

10 Claims, 10 Drawing Sheets

TOILET TANK FILL VALVE CONNECTABLE TO RISER WITH PRE-SELECTED HEIGHT

BACKGROUND OF THE INVENTION

The present invention relates to plumbing fixtures, and more particularly, to fill valves that automatically re-fill the tank of a gravity operated flush toilet.

A conventional gravity operated flush toilet has several basic components. The china components include a porcelain bowl and a porcelain tank mounted on top of the bowl. The bowl and tank may either be separate pieces or may be molded as a single unitary piece of china. The plumbing components of a conventional gravity operated flush toilet include a fill valve in the tank that is connected to a water supply line, a flush valve mounted in a hole in the bottom wall of the tank that communicates with the bowl, a flapper valve that normally closes the flush valve, and a lever or push button on the outer wall of the tank that is connected with a chain or other mechanical linkage for momentarily lifting the flapper valve. This allows water stored in the tank to flow rapidly through the flush valve into the bowl to carry waste along with the water through a trap connected to the underside of the bowl and into a waste pipe connected to a sewer line, septic tank or other waste reservoir.

For many years ballcock fill valves have been utilized in toilet tanks. They are noisy, require much space to operate, and must be adjusted upon installation based on the supply line water pressure in order to ensure proper shut off. Their most annoying attribute is that they tend to run on and make a hissing noise for a long duration as the float arm gradually shuts off the flow of water into the toilet tank. Almost everyone at one time or another has had the experience of lifting the toilet tank lid and bending the metal float arm in the hopes of achieving a proper shut off Pilot operated toilet tank fill valves have been developed which are quieter, require less space, are more durable and have positive, rapid shut off. One example is the Model 528 fill valve sold under the HUNTER trademark by Hunter Plumbing Products of San Marcos, Calif. The Model 528 HUNTER fill valve embodies the invention disclosed in U.S. Pat. No. 5,715,859 of David Nichols-Roy granted Feb. 10, 1998.

In the United States there are two basic markets for toilet tank fill valves, namely, the original equipment manufacturer (OEM) market and the after-installation market. The former consists of large toilet manufacturers such as American Standard and Kohler who assemble and sell complete gravity operated flush toilets including fill valves. The latter consists of hardware and plumbing supply stores that sell to plumbers and home owners for repair and replacement in toilets already installed in residences.

Every gravity operated flush toilet has an optimum fill level which ensures that enough water is in the tank for proper flushing without wasting water or risking incomplete waste carry out. For many years gravity operated flush toilets in the United States had tanks with capacities of three and one-half, five gallons or more. In recent years, the Environmental Protection Agency (EPA) has mandated that low water consumption toilets be installed in all new construction and during all re-models, with a maximum water usage of 1.6 gallons per flush. Both the older high volume gravity operated flush toilets and the newer low volume gravity operated flush toilets come in a wide range of tank configurations with different optimum fill levels. Because of this, the Model 528 HUNTER fill valve has been manufactured with a telescoping riser so that the main body of the fill valve that contains the pilot operated diaphragm valve and the float arm can be set for the predetermined height that will ensure that the tank refills to the optimum level. The Model 528 HUNTER fill valve is advantageously sold into the after-installation market since it permits plumbers and do-it-yourself homeowners to install the fill valve and rapidly adjust its height as necessary. However, the OEM market requires no such adjustability. The telescoping members and locking devices used in some fill valves to fix their positions represent unneeded material and complexity for the OEM market. However, it would be unduly expensive to manufacture a variety of different fill valves having different fixed heights to satisfy the configurations of the various gravity operated flush toilets manufactured in the United States and abroad.

SUMMARY OF THE INVENTION

It is therefore the primary object of the present invention to provide a fill valve for the OEM market that can be readily adapted to the tank profile of a particular gravity operated flush toilet.

It is another object of the present invention to provide a fill valve that is easily connectable to a riser of a fixed length.

In accordance with the present invention, a fill valve includes a main valve body that encloses and supports a pilot operated diaphragm valve. A pivoting float arm has a float end and an inner end that engages the diaphragm valve to open and close the diaphragm valve in response to the level of water in the tank in which the fill valve is mounted. The fill valve further includes a hollow riser having a lower end configured for connection to a water supply line. The riser has an upper end configured for connection to the main valve body. The riser conveys pressurized water from the supply line to the diaphragm valve. Mating couplers are provided on an upper end of the riser and on an underside of the main valve body for rigidly securing the riser to the main valve body. The riser has a length that is pre-selected to place the diaphragm valve and float arm a predetermined height within the tank to ensure that the tank is re-filled to a predetermined optimum level for flushing.

DESCRIPTION OF THE PREFERRED EMBODIMENTS

Figure 1:
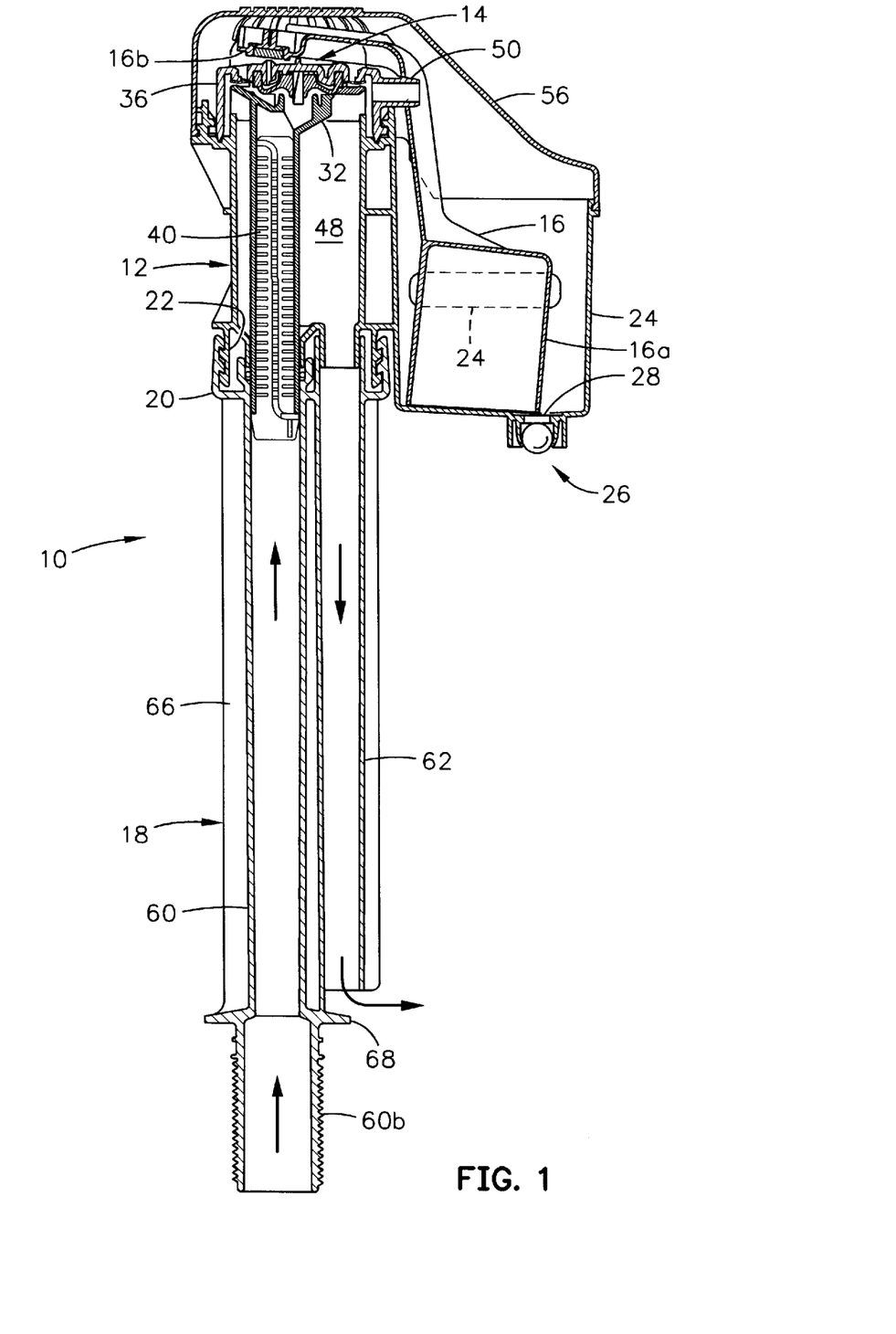
FIG. 1 is a vertical sectional view through a preferred embodiment of the fill valve of the present invention.

FIG. 1 is a vertical sectional view through a preferred embodiment 10 of the fill valve of the present invention. Except for its elastomeric seals, the fill valve 10 may be inexpensively manufactured from plastic parts injection molded out of polypropylene plastic or other suitable thermoplastic material. The fill valve 10 includes a main valve body 12 that encloses and supports a pilot operated diaphragm valve 14. A pivoting float arm 16 has an outer float end 16a and an inner end 16b that engages the diaphragm valve 14 to open and close the diaphragm valve 14 in response to the level of water in a toilet tank (not shown) in which the fill valve 10 is vertically mounted. The use of the pilot operated diaphragm valve 14 is advantageous since, unlike the case with ballcock fill valves, variations in water pressure do not affect the level to which the fill valve 10 will refill the toilet tank.

The fill valve 10 further includes a hollow riser 18 (FIG. 1) having a lower end 18a configured for connection to a water supply line (not shown). The riser 18 has an upper end configured for connection to the main valve body 12. The riser 18 conveys pressurized water from the supply line to the diaphragm valve 14. Mating couplers 20 and 22 are provided on an upper end of the riser and on an underside of the main valve body 12, respectively, for rigidly securing the riser 18 to the main valve body 12. The riser 18 has a length that is pre-selected to place the diaphragm valve 14 and float arm 16 a predetermined height within the toilet tank to ensure that the tank is re-filled to its predetermined optimum level for flushing. The optimum level is preferably less than or equal to 1.6 gallons in newer toilets subject to the EPA regulation, but high enough to ensure proper flushing action. The optimum re-fill level is typically indicated inside the tank by a permanent ink marker or molded feature on the inside surface of a vertical wall of the toilet tank.

A float housing 24 (FIG. 1) extends from the side of the main valve body 12 and encloses the float 16a for pivoting movement. An aperture 24a is provided in a side wall of the float housing 24. The combination of the side wall of the float housing 24 and the aperture 24a operate as a weir when the tank is refilled. A check valve 26 is mounted in a drain hole 28 in a bottom wall of the float housing 24. The drain hole and check valve 26 ensure that the float arm 16 rapidly pivots in the clock-wise direction upon flushing. The float arm 16 rapidly pivots in the counter-clockwise direction upon filling of the tank to the point where the water spills into the float housing 24 through the aperture 24a.

Figure 2:
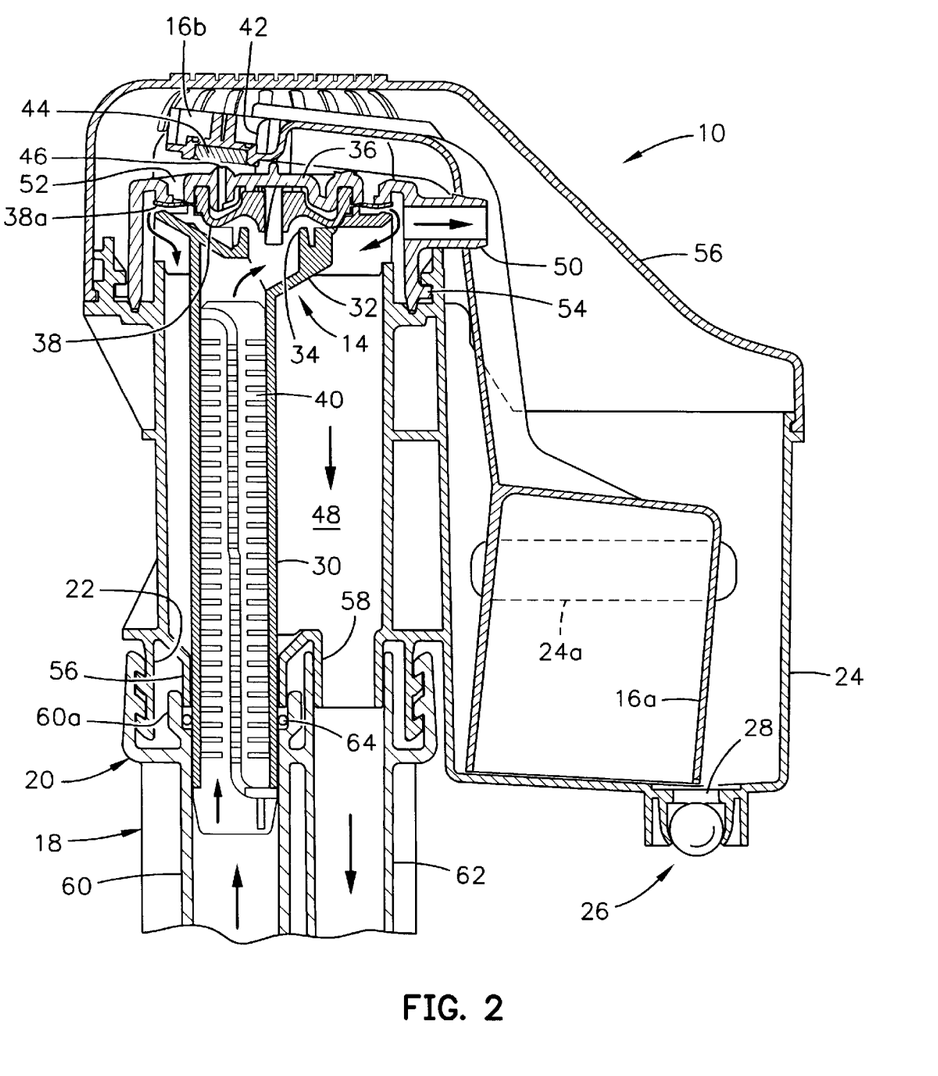
FIG. 2 is an enlarged portion of FIG. 1 illustrating details of the diaphragm valve, float arm and riser coupling of the fill valve of FIG. 1.

The diaphragm valve 14 includes a supply tube 30 (FIG. 2) and an annular valve chamber wall 32 that extends radially outwardly and slightly upwardly from an upper end of the supply tube 30. The valve chamber wall 32 defines an annular valve seat 34. A cylindrical valve cap 36 overlies the valve chamber wall 32. A deformable valve member 38 is positioned inside a valve chamber formed between the valve chamber wall 32 and the valve cap 36. The valve member 38 may be made of a suitable elastomeric material such as synthetic rubber. A strainer 40 is mounted inside the supply tube 30 for removing particulate debris in the water that would clog, damage or otherwise interfere with the proper operation of the diaphragm valve 14.

The inner end 16b (FIG. 2) of the float arm 16 is pivotally connected to a pair of upstanding trunnions 42 formed on the valve cap 36. An elastomeric pad 44 on the inner end 16b of the float arm 16 engages and disengages the valve cap 36 to open and close a pilot orifice 46 formed in the valve cap 36. When the pilot orifice 46 is unsealed, the pressure on the under side of the deformable valve member 38 allows it to flex upwardly off of the valve seat 34, allowing water to flow through a plurality of radially extending slots in the valve chamber wall 3 2 that form passages for water to travel down into an outlet chamber 48 of the main valve body 12. A portion of the water that is passed by the diaphragm valve 14 escapes through an outlet fitting 50 to a flexible tube (now shown) for refilling the toilet bowl. One or more openings 52 are provided in the valve cap 36 and in combination with a thin extension 38a of the deformable valve member 38 provide a vacuum breaker. The valve cap 36 is preferably connected to the main valve body 12 with a bayonet style coupling visible at 54. A streamlined slotted cover 56 removably snaps over the main valve body 12, the diaphragm valve 14, the float arm 16 and the float housing 24.

Except for the shortened offset supply tube 30, shortened strainer 40 and outlet chamber 48, and except as further described hereafter, the construction of the fill valve 10 is similar to that shown and described in U.S. Pat. No. 5,715,859 of David Nichols-Roy, the entire disclosure of which is specifically incorporated herein by reference as though fully set forth.

Figure 3:
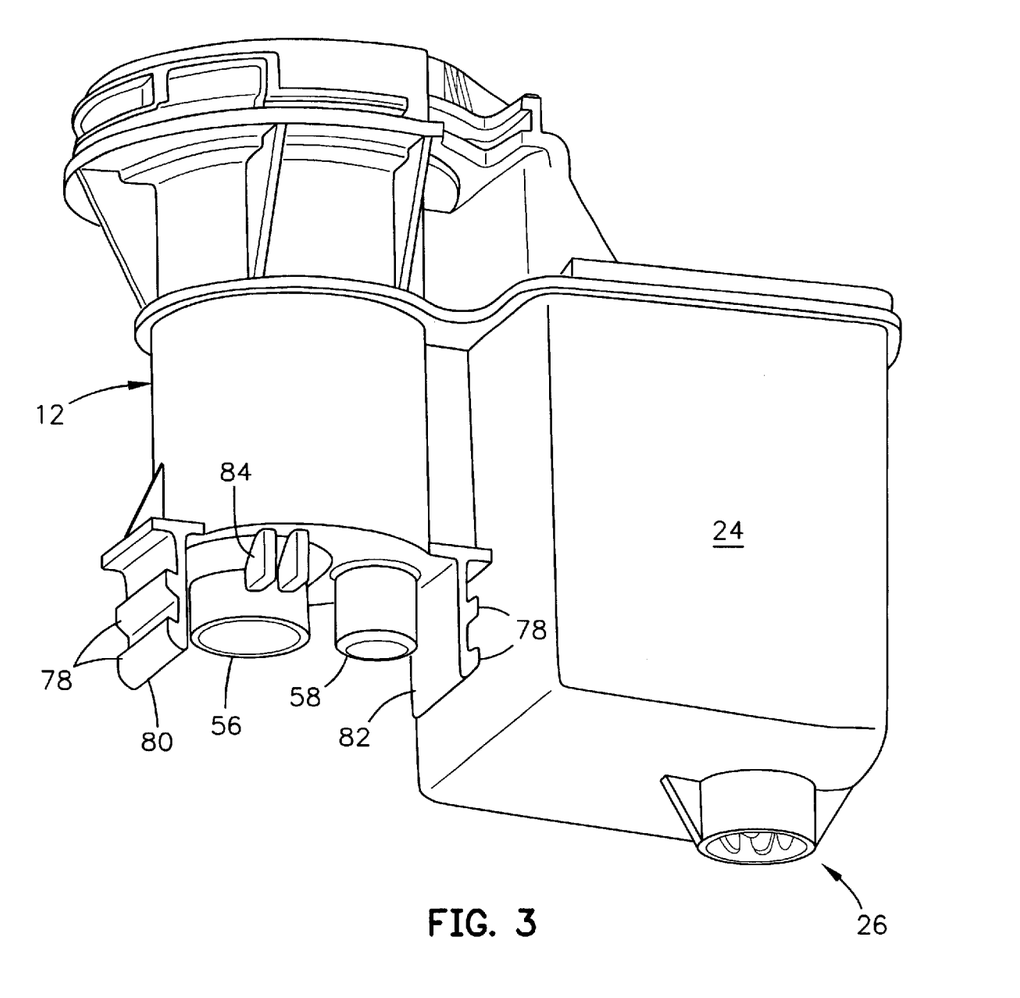
FIG. 3 is a perspective view of the main valve body of the fill valve of FIG. 1 prior to the attachment of the riser to its underside.

As best seen in FIG. 3, the main valve body 12 is formed with a cylindrical downwardly projecting inlet 56 and a cylindrical downwardly projecting outlet 58. The riser 18 is formed with a tubular inlet conduit 60 (FIG. 1) and a tubular outlet conduit 62. The conduits 60 and 62 have upper ends that are sized to snugly join with the inlet 56 and outlet 58 of the main valve body 12, respectively. The outlet conduit 62 has a lower end which terminates before a lower end of the inlet conduit 60 so that water can flow through the inlet conduit 60, through the diaphragm valve 14, through the outlet conduit 62 and into the bottom of the tank. A water tight seal is provided between the upper end of the inlet conduit 60 and the inlet 56 of the main valve body 12. The water tight seal preferably is provided in the form of an O-ring 64 that surrounds the upper end of the inlet conduit 60. This water tight seal is necessary since the water from the supply line is under pressure and any leakage at the coupling between the inlet conduit 60 and the inlet 56 of the main valve body 12 would bypass the diaphragm valve 14 which is further downstream.

Figure 4:
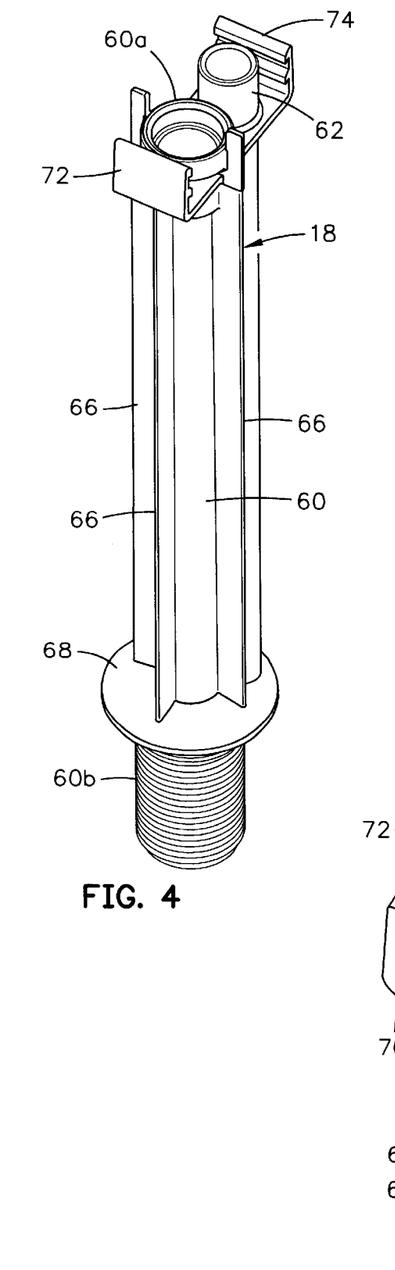
FIG. 4 is a perspective view of the riser of the fill valve of FIG. 1 taken from the upper end thereof.
Figure 5:
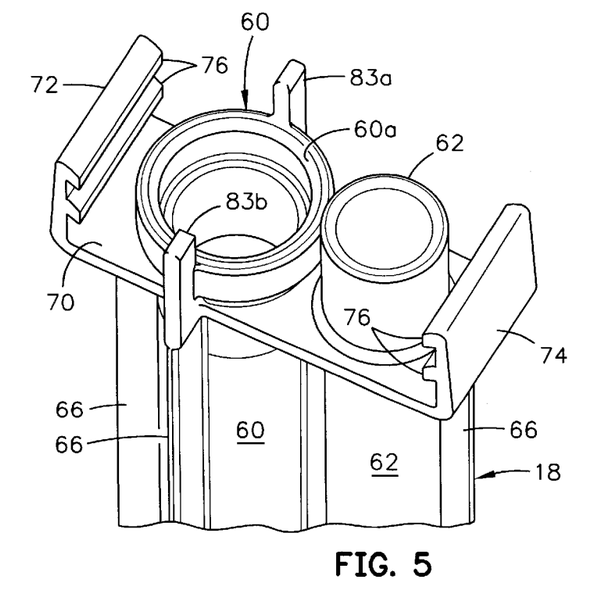
FIG. 5 is an enlarged fragmentary perspective view showing details of the upper end of the riser of the fill valve of FIG. 1.

The inlet conduit 60 and the outlet conduit 62 are formed in side by side relation and are reinforced by four ninety-degree spaced vanes 66 (FIG. 4) that extend vertically nearly the entire length of the conduits 60 and 62. The vanes 66 are connected at their lower ends by a horizontally extending circular flange 68. The upper ends of the vanes 66 are connected by a horizontally extending rectangular flange 70 (FIG. 5).

The upper end of the inlet conduit 60 is formed to provide an enlarged portion 60a (FIG. 5) for fitting over the inlet 56 of the main valve body 12. The lower end of the inlet conduit 60 is formed to provide a male threaded portion 60b (FIG. 4) over which the standard female threaded fitting (not shown) of a conventional water supply line coupling is screwed. It will be understood by those skilled in the art that upon installation of the fill valve 10 into a toilet tank, an O-ring or sealing gasket (not shown) is fit over the threaded portion 60b of the inlet conduit 60. The threaded portion 60b is then inserted through a hole in the bottom wall of the porcelain toilet tank. The female threaded fitting of the conventional water supply line coupling is screwed over the male threaded portion 60b of the inlet conduit 60 tight up against the underside of the bottom wall of the toilet tank. This firmly holds the fill valve 10 in a vertical orientation inside the toilet tank. The O-ring surrounding the male threaded portion 60b of the inlet conduit 60 is squeezed between the upperside of the bottom wall of the tank and the flange 68 to provide a water tight seal.

The riser 18 has a pair of first generally L-shaped clasp arms 72 and 74 (FIG. 5) that project from opposite sides of the flange 70 formed at the upper end of the riser 18. The arms 72 and 74 are formed with a first set of vertically spaced, inwardly and downwardly angled ridges 76. The arms 72 and 74 are resilient and can expand apart in order to engage the ridges 76 with a complementary set of vertically spaced ridges 78 (FIG. 3). The ridges 78 are formed on a pair of generally L-shaped clasp arms 80 and 82 that project downwardly from opposite sides of the bottom of the main valve body 12. The ridges 78 extend outwardly and upwardly at an angle that complements the angle of extension of the ridges 76. Thus the upper end of the riser 18 can be manually joined with the bottom of the main valve body 12 by simply inserting the former into the latter. The V-shape of the outermost ridges 76 and 78 will engage and cause the arms 72 and 74 to spread apart until all of the ridges 76 and 78 engage each and the arms 72 and 74 snap back inwardly to their original positions, thereby providing a positive locking connection that squeezes the O-ring 64.

Vertical guide members 83a and 83b (FIG. 5) are formed on the upper end of the riser 18. The guide members 83a and 83b insert between corresponding pairs of vertical guide ribs, only one set 84 of which is visible in FIG. 3. The guide ribs 84 extend downwardly from the main valve body 12. The guide members 83a and 83b ensure that the upper ends of the inlet conduit 60 and outlet conduit 62 correctly mate with the inlet 56 and outlet 58 of the main valve body 12. The guide members 88a and 83b also engage the guide ribs 84 to provide a stop to prevent rotation between the riser 18 and the main valve body 12 thus relieving strain that would otherwise be imposed on the inlet 56 and outlet 58. The mating of the guide members 83a and 83b and the guide ribs 84 also ensures that the arms 72 and 74 of the riser 18 are not rotated so as to disengage with the arms 80 and 82 of the main valve body 12. This could lead to partial de-coupling of the riser 18 and the main valve body 12, relieving pressure on the O-ring 64 and allowing pressurized water to escape.

When the user is tightening the water supply line coupling over the lower threaded portion 60b of the riser 18, the user is typically holding on to the main valve body 12 with his or her other hand. Significant torque can be induced between the riser and the main valve body 12. The principal aspect of the fill valve 10 that prevents the upper end of the riser 18 from de-coupling with the main valve body 12 as a result of this torque is the fact that the inlet and outlet conduits 60 and 62 are spaced in side-by-side relation and their upper ends are coupled to the inlet and outlet 58 of the main valve body 12.

The riser 18 can be manufactured in a variety of lengths adapted for the requirements of a particular OEM of gravity flush operated toilet tanks. In large volumes the chosen risers can be rapidly coupled to the main valve bodys and shipped to OEMs, who need merely to install the assembled fill valves into the toilet tanks. It is no longer necessary for them to adjust the height of the vertical telescoping risers heretofore employed in diaphragm fill valves of this general type.

Figure 6:
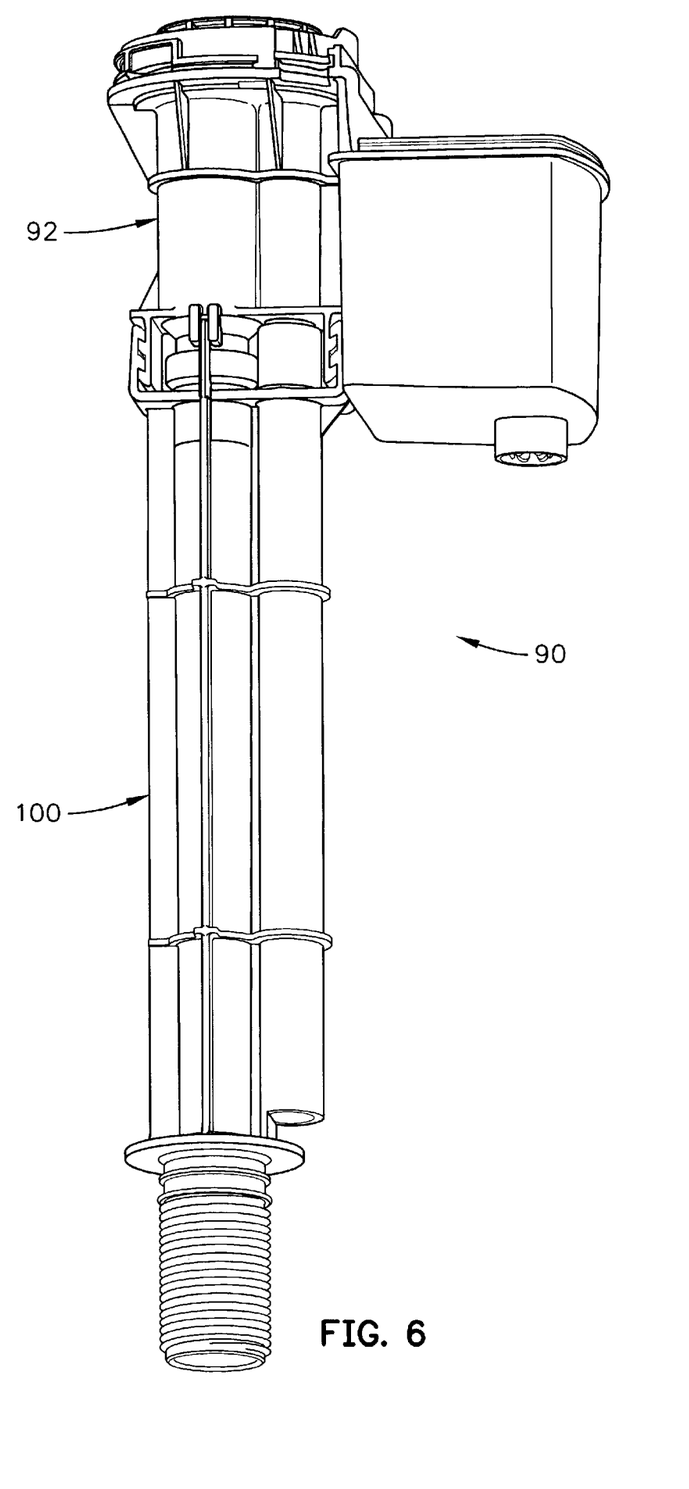
FIG. 6 is a perspective view of an alternate embodiment of the fill valve of the present invention.
Figure 7A:
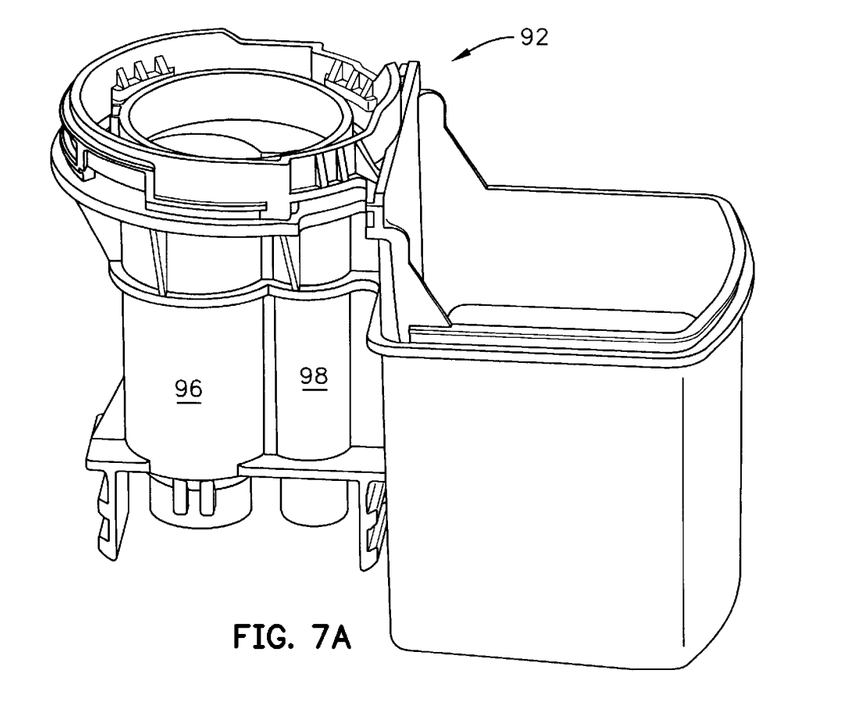
FIGS. 7A–7D are a series of slightly enlarged perspective views showing various aspects of the main valve body of the fill valve of FIG. 6.
Figure 7B:
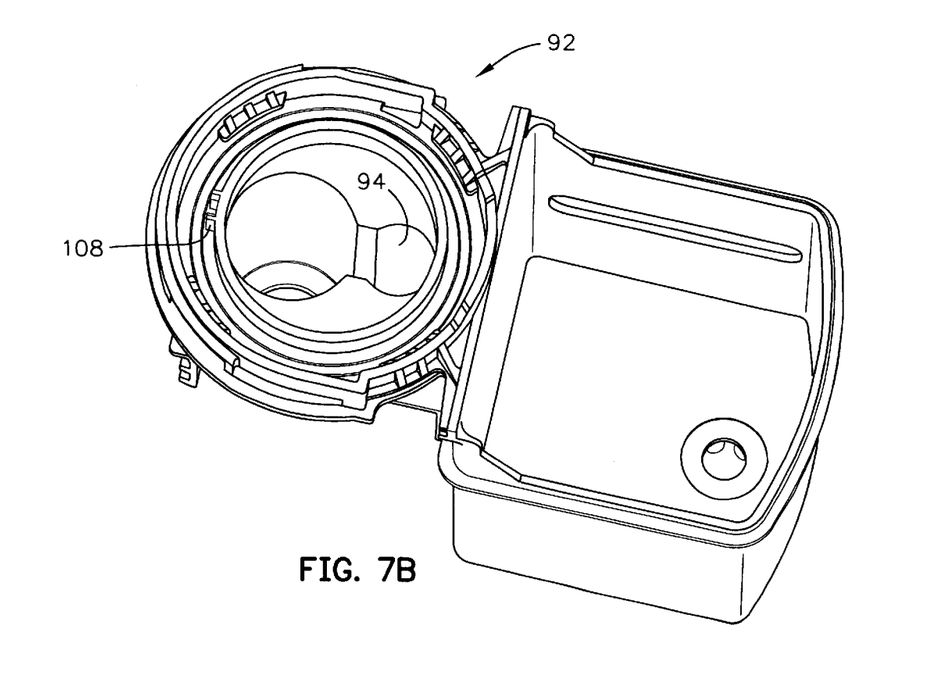
Figure 7C:
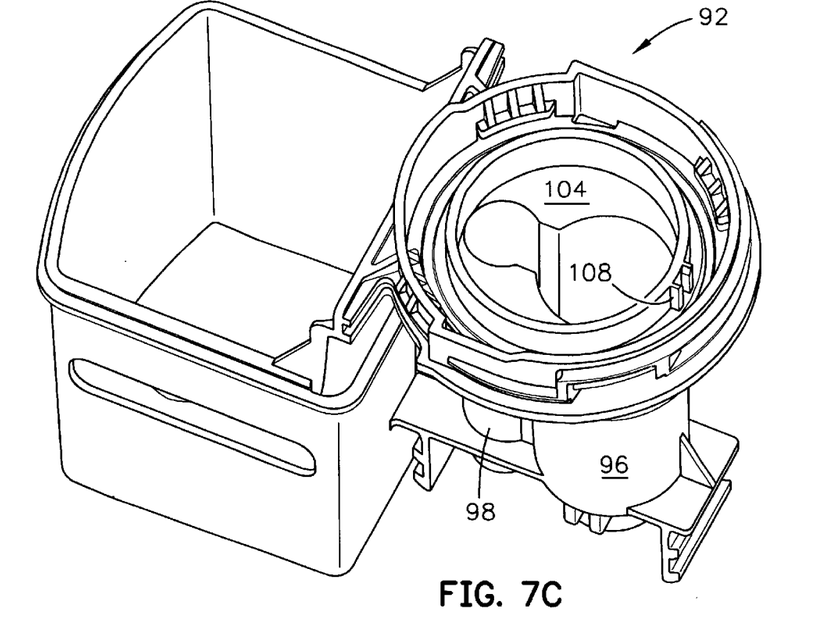
Figure 7D:
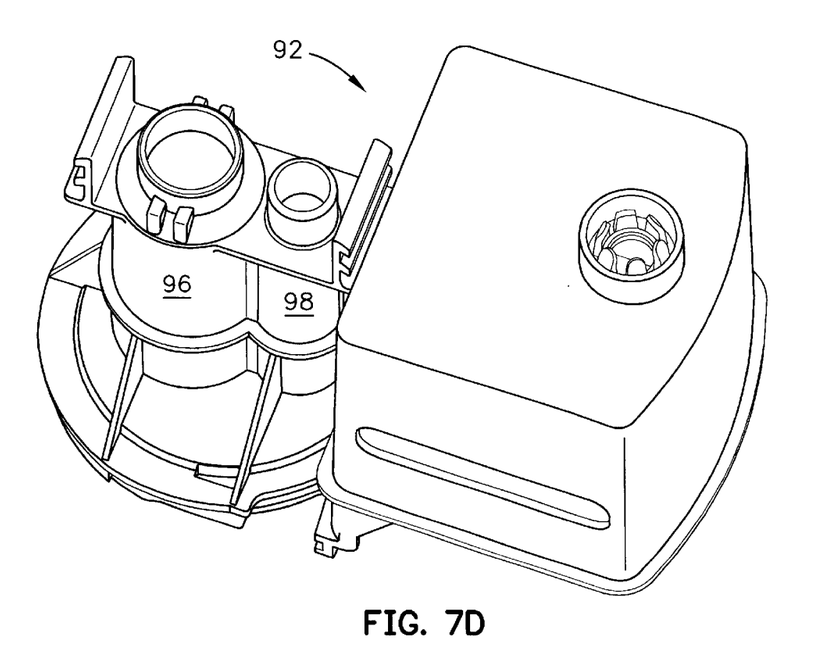
Figure 8:
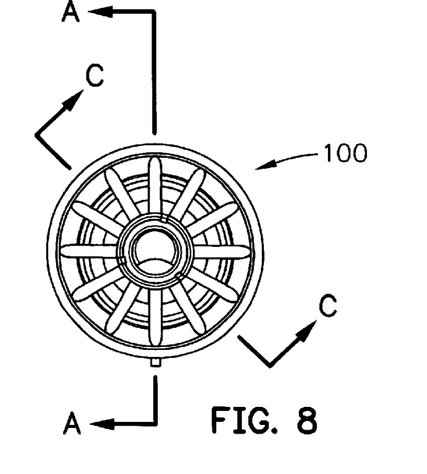
FIG. 8 is a top plan view of the supply tube of the fill valve of FIG. 6.
Figure 9:
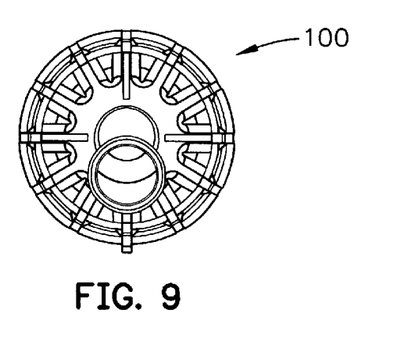
FIG. 9 is a bottom plan view of the supply tube of the fill valve of FIG. 6.
Figure 10:
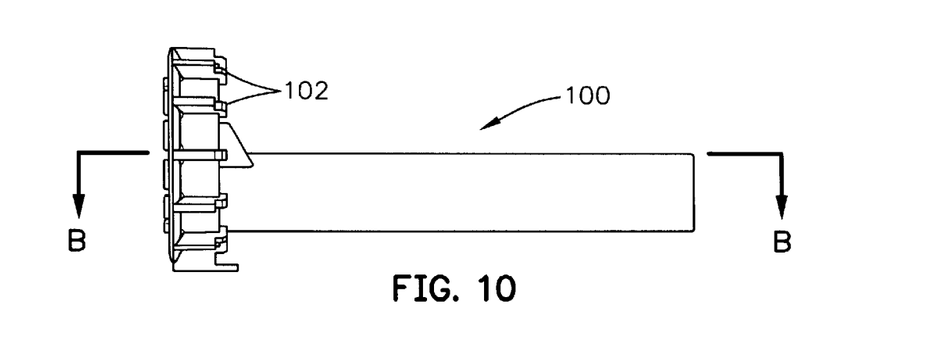
FIG. 10 is a reduced side elevation view of the supply tube of the fill valve of FIG. 6.
Figure 11:
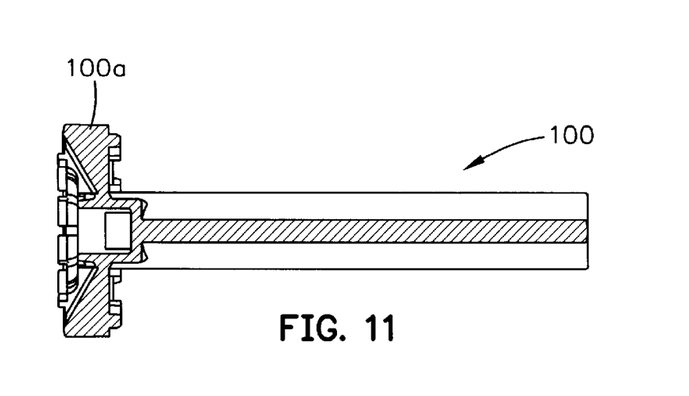
FIG. 11 is a longitudinal sectional view of the supply tube taken along line B—B of FIG. 10.
Figure 12:
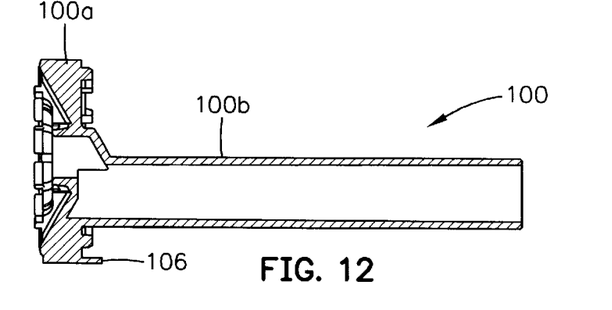
FIG. 12 is sectional view of the supply tube taken along line A—A of FIG. 8.
Figure 13:
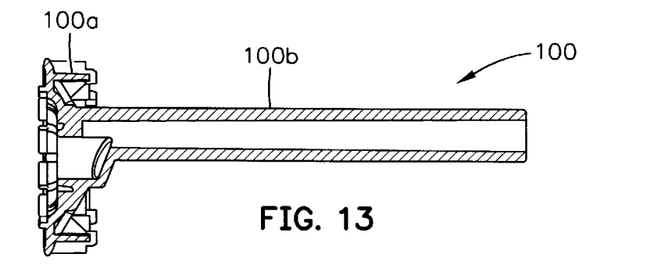
FIG. 13 is a sectional view of the supply tube taken along line C—C of FIG. 8.
Figure 14:
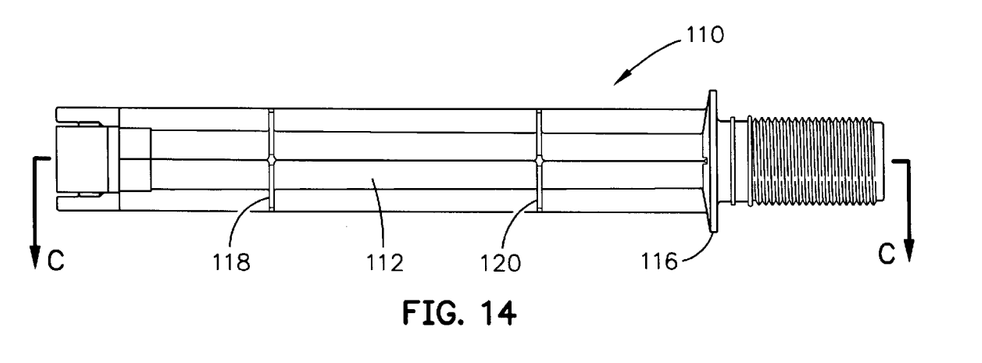
FIG. 14 is a side elevation view of the riser of the fill valve of FIG. 6.
Figure 15:
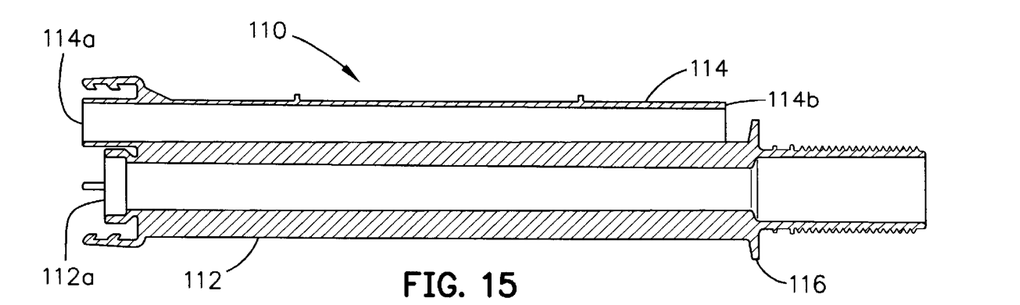
FIG. 15 is a longitudinal sectional view of the riser taken along line C—C of FIG. 14.
Figure 16:
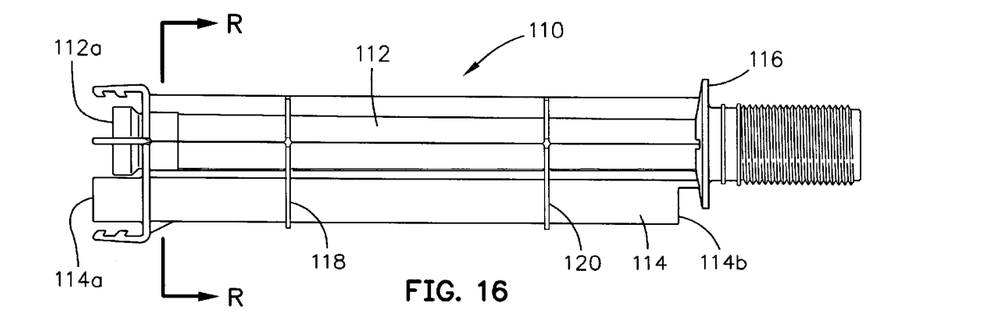
FIG. 16 is another side elevation view of the riser rotated ninety degrees from the orientation shown in FIG. 14.
Figure 17:
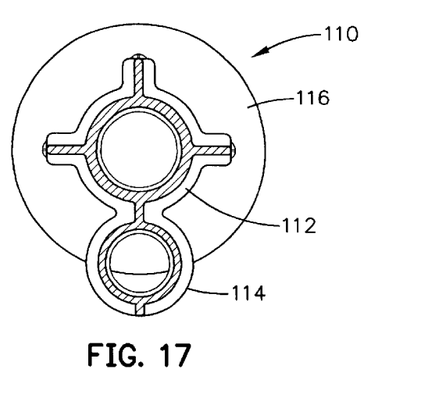
FIG. 17 is a cross-sectional view of the riser taken along line R—R of FIG. 16.
Figure 18:
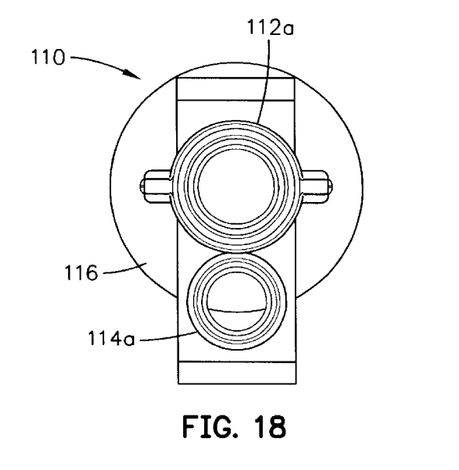
FIG. 18 is a top plan view of the riser of FIG. 14 showing its upper end with its clasp arms.
Figure 19:
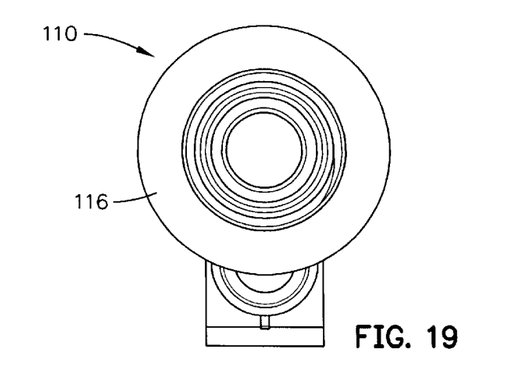
FIG. 19 is a bottom plan view of the riser of FIG. 14 showing its lower end.

FIG. 6 illustrates an alternate embodiment 90 of the fill valve of the present invention in which the main valve body 92 (FIGS. 7A–7D) is reconfigured to provide a smaller outlet chamber 94 (FIG. 7B), a longer inlet 96 (FIG. 7A) and a longer outlet 98 (FIG. 7D). This arrangement reduces the tendency of the embodiment of FIGS. 1–5 to generate a noisy re-fill of the tank due to air trapped in the large outlet chamber 48. In the fill valve 90 (FIG. 6) there is less air to purge in the smaller outlet chamber 94 due to its reduced volume compared to the outlet chamber 48.

Referring to FIGS. 8–13, the supply tube 100 of the fill valve 90 has projections 102 (FIG. 10) that engage a horizontal surface 104 (FIG. 7C) of the main valve body 92 to provide a gap underneath the radial wall portion 100a (FIG. 11) of the supply tube 100 to facilitate operation of the diaphragm valve (not visible). The eccentric position of the main supply tube portion 100b relative to the radial wall portion 100a is visible in FIG. 12. The main supply tube portion 100b is received concentrically within the longer inlet 96. A tooth 106 (FIG. 12) on the supply tube 100 is received between upstanding guides 108 (FIG. 7B on the main valve body 92 to align the supply tube 100.

Details of the riser 110 of the fill valve 90 are shown in FIGS. 14–19. The inlet conduit 112 (FIG. 16) has an enlarged upper end 112a dimensioned to snugly fit over the inlet 96 on the underside of the main valve body 92. The outlet conduit 114 has an upper end 114a dimensioned to snugly fit over the outlet 98 on the underside of the main valve body 92. The outlet conduit 114 has a lower end 114b that terminates short of the mounting flange 116 of the riser 110 to facilitate refill of the toilet tank. A pair of vertically spaced reinforcing ribs 118 and 120 extend circumferentially around the conduits 112 and 114.

While I have described two alternate embodiments of a fill valve that is connectable to a riser with a pre-selected height, it should be apparent to those skilled in the art that my invention can be modified in arrangement and detail. For example, my invention is not limited to fill valves that use pilot operated diaphragm valves. Ballcock style valves could be utilized. In addition, my fill valve has uses outside of toilets. For example, it could be adapted for use with swimming pools, swamp coolers, horse trough fillers, etc., in addition to flush toilets assembled by OEMs. Accordingly, as used herein, the word "tank" refers not only to toilet tanks but to any liquid reservoir. Therefore, the protection afforded my invention should only be limited in accordance with the following claims.

I claim:

1. A fill valve, comprising:

a main valve body;

a valve mounted in the main valve body;

a pivoting float arm having a float end and an inner end that opens and closes the valve in response to a level of water in a tank;

a hollow riser having a lower end configured for connection to a water supply line and an upper end configured for connection to the main valve body for conveying pressurized water to the valve, the riser having a length that is pre-selected to place the valve and float arm a predetermined height within the tank to ensure that the tank is re-filled to a predetermined optimum level; and mating couplers on an upper end of the riser and on the main valve body for rigidly securing the riser to the main valve body, including a pair of first clasp arms, one clasp arm of the first pair projecting upwardly from the upper end of the riser on one side of the riser and the other clasp arm of the first pair projecting upwardly from the upper end of the riser on the other side of the riser, and a pair of second clasp arms, one clasp arm of the second pair projecting downwardly from one side of the main valve body, and the other clasp arm of the second pair projecting downwardly from the other side of the main valve body, the first and second clasp arms being configured so that each clasp arm of the first pair mates with a corresponding clasp arm of the second pair to provide a positive locking connection between the riser and the main valve body.

2. The fill valve of claim 1 wherein the main valve body is formed with an inlet and an outlet, and the riser includes an inlet conduit that joins with the inlet of the main valve body.

3. The fill valve of claim 2 wherein the riser also includes an outlet conduit that has a lower end which terminates before a lower end of the inlet conduit so that water can flow through the inlet conduit, through the valve, through the outlet conduit and into the tank.

4. The fill valve of claim 2 and further comprising a water tight seal between the upper end of the inlet riser and the inlet of the main valve body.

5. The fill valve of claim 4 wherein the water tight seal includes an O-ring surrounding the upper end of the inlet conduit.

6. The fill valve of claim 1 wherein the valve is a diaphragm valve.

7. The fill valve of claim 6 wherein the diaphragm valve includes a supply tube and a strainer inside the supply tube.

8. The fill valve of claim 1 wherein the clasp arms of the mating couplers include engaging ridges.

9. The fill valve of claim 1 wherein the clasp arms of the first pair are configured to spread apart and then snap back around the clasp arms of the second pair.

10. A fill valve, comprising:

a main valve body having an inlet and an outlet on an underside thereof;

a pilot operated diaphragm valve mounted in the main valve body, the diaphragm valve including a supply tube and a valve chamber wall extending radially from an upper end of the supply tube and defining a valve seat, a valve cap with a pilot orifice connected to the valve chamber wall and a deformable valve member positioned inside a valve chamber formed between the valve chamber wall and the valve cap;

a pivoting float arm having a float end and an inner end that engages the diaphragm valve to open and close the pilot orifice in the valve cap to thereby open and close the diaphragm valve in response to a level of water in a tank;

a hollow riser having an inlet conduit and an outlet conduit having upper ends that join with the inlet and outlet of the main valve body, respectively, a lower end of the inlet conduct being configured for connection to a water supply line for conveying pressurized water to the diaphragm valve, the inlet conduit having a length that is pre-selected to place the diaphragm valve and float arm a predetermined height within the tank to ensure that the tank is re-filled to a predetermined optimum level, and the outlet conduit having a lower end which terminates before the lower end of the inlet conduit so that water can flow through the inlet conduit, through the diaphragm valve, through the outlet conduit and into the tank;

a water tight seal between the upper end of the inlet riser and the inlet of the main valve body; and mating couplers on an upper end of the riser and on an underside of the main valve body for rigidly securing the riser to the main valve body, including a pair of first clasp arms, one clasp arm of the first pair projecting upwardly from the upper end of the riser on one side of the riser and the other clasp arm of the first pair projecting upwardly from the upper end of the riser on the other side of the riser, and a pair of second clasp arms, one clasp arm of the second pair projecting downwardly from one side of the main valve body, and the other clasp arm of the second pair projecting downwardly from the other side of the main valve body, the first and second clasp arms being configured so that each clasp arm of the first pair mates with a corresponding clasp arm of the second pair to provide a positive locking connection between the riser and the main valve body.

* * * * *